United States Patent
Boydston et al.

(10) Patent No.: US 12,521,947 B2
(45) Date of Patent: Jan. 13, 2026

(54) FABRICATION OF RESIN OBJECTS USING FOCUSED ULTRASOUND WAVES

(71) Applicant: Wisconsin Alumni Research Foundation, Madison, WI (US)

(72) Inventors: Andrew Jackson Boydston, Middleton, WI (US); Jianxun Cui, Worcester, MA (US); Chang-Uk Lee, Verona, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 105 days.

(21) Appl. No.: 18/576,886

(22) PCT Filed: Jul. 11, 2022

(86) PCT No.: PCT/US2022/073588
§ 371 (c)(1),
(2) Date: Jan. 5, 2024

(87) PCT Pub. No.: WO2023/288189
PCT Pub. Date: Jan. 19, 2023

(65) Prior Publication Data
US 2024/0278513 A1    Aug. 22, 2024

Related U.S. Application Data

(60) Provisional application No. 63/221,744, filed on Jul. 14, 2021.

(51) Int. Cl.
 *B29C 71/04* (2006.01)
 *B29C 35/02* (2006.01)
 (Continued)

(52) U.S. Cl.
 CPC .......... *B29C 71/04* (2013.01); *B29C 35/0261* (2013.01); *B29C 70/70* (2013.01);
 (Continued)

(58) Field of Classification Search
 CPC ..... B29C 64/124; B29C 64/336; B29C 64/40; B29C 64/135; B33Y 10/00
 See application file for complete search history.

(56) References Cited

U.S. PATENT DOCUMENTS

| 2009/0077899 A1 | 3/2009 | Park et al. |
| 2011/0152400 A1* | 6/2011 | Van Lelieveld ....... A61K 6/893 |
| | | 423/608 |

(Continued)

FOREIGN PATENT DOCUMENTS

| WO | 2012143786 A1 | 10/2012 |
| WO | 2018145194 A1 | 8/2018 |
| WO | 2022011456 A1 | 1/2022 |

OTHER PUBLICATIONS

International Search Report prepared by the Korean Intellectual Property Office for International application No. PCT/US2022/073588, Nov. 7, 2022.

(Continued)

*Primary Examiner* — Seyed Masoud Malekzadeh
(74) *Attorney, Agent, or Firm* — Bell & Manning, LLC

(57) ABSTRACT

Methods for fabricating a resin object are provided. In embodiments. such a method comprises irradiating a curable composite with a focal spot of a focused ultrasound beam. the curable composite comprising a porous material having a solid matrix defining pores distributed throughout the solid matrix and a curable composition comprising prepolymers filling the pores. to form at least one cured region of polymer within the curable composite so as to provide a resin object comprising an interpenetrating network comprising the solid matrix of the porous material entangled with the polymer of the at least one cured region.

14 Claims, 14 Drawing Sheets

(51) Int. Cl.
   *B29C 70/70*   (2006.01)
   *B33Y 40/20*   (2020.01)
   B29K 33/00    (2006.01)
   B29K 105/00   (2006.01)
   B29K 105/04   (2006.01)
   B33Y 70/00    (2020.01)

(52) U.S. Cl.
   CPC .......... *B33Y 40/20* (2020.01); *B29K 2033/08* (2013.01); *B29K 2105/0094* (2013.01); *B29K 2105/04* (2013.01); *B33Y 70/00* (2014.12)

(56) References Cited

U.S. PATENT DOCUMENTS

2017/0045877 A1    2/2017  Shapiro et al.
2024/0278513 A1*   8/2024  Boydston ................ B29C 71/04

OTHER PUBLICATIONS

Teramoto, Naozumi et al., Polymer foam-reinforced hydrogels inspired by plant body frameworks as high-performance soft matter, Polymer Journal, May 21, 2014 (Online publication date), vol. 46, pp. 592-597.

Habibi, Mohsen, Shervin Foroughi, Vahid Karamzadeh, and Muthukumaran Packirisamy. "Direct sound printing." Nature Communications 13, No. 1 (2022): 1800.

* cited by examiner

FABRICATION OF RESIN OBJECTS USING FOCUSED ULTRASOUND WAVES

CROSS-REFERENCE TO RELATED APPLICATIONS

The present application is a National Stage of International Application No. PCT/US22/73588, filed Jul. 11, 2022, which claims priority to U.S. provisional patent application No. 63/221,744 that was filed Jul. 14, 2021, the entire contents of both of which are incorporated herein by reference.

REFERENCE TO GOVERNMENT RIGHTS

This invention was made with government support under W911NF-17-1-0595, W911NF-17-2-0199 and W911NF-20-2-0182 awarded by the ARMY/ARO. The government has certain rights in the invention.

BACKGROUND

Additive manufacturing (AM), also known as 3D printing, refers to a number of technologies for fabricating three-dimensional (3D) objects based on digital data representing those 3D objects. There are a number of 3D printing technologies for polymeric (resin) materials, which are based on the types of starting materials (i.e., powder, pellets, wires, and liquids). Stereolithography (SLA) is a type of 3D printing technique in which liquid containing photoactive starting materials in a vat is selectively cured by light-induced polymerization. The use of light to induce polymerization imposes certain requirements on SLA systems, e.g., the vat must include a window transparent to the light. In addition, existing 3D printing techniques, including SLA, generally involve breaking down the 3D digital data into a series of two-dimensional (2D) cross-sections and fabricating the 3D object in a layer-by-layer fashion. This requires additional processing and can interfere with the aesthetics and functionality of the resulting layered 3D object.

SUMMARY

Provided are methods for fabricating resin objects from curable compositions using focused ultrasound. In embodiments, a method for fabricating a resin object comprises irradiating a curable composite with a focal spot of a focused ultrasound beam, the curable composite comprising a porous material having a solid matrix defining pores distributed throughout the solid matrix and a curable composition comprising prepolymers filling the pores, to form at least one cured region of polymer within the curable composite so as to provide a resin object comprising an interpenetrating network comprising the solid matrix of the porous material entangled with the polymer of the at least one cured region.

Systems for carrying out the methods are also provided. The objects fabricated by the present methods are also provided, including composite resin objects.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
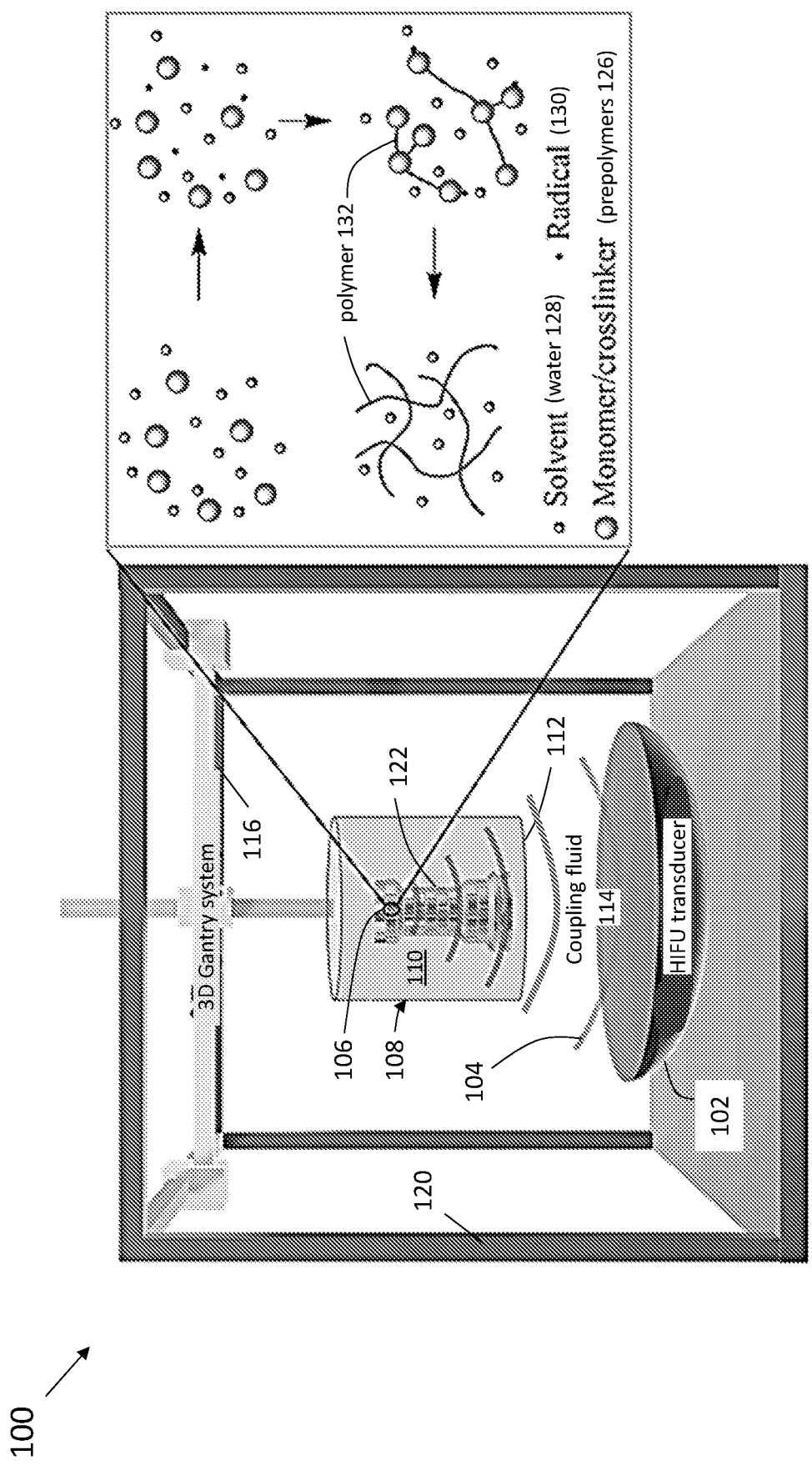
FIG. 1 shows an illustrative system 100 which may be used to carry out the present methods.

The present methods and systems allow for the fabrication of resin objects, including 3D resin objects, from curable compositions comprising prepolymers. The methods and systems make use of focused ultrasound to induce curing of the prepolymers. The methods comprise irradiating a curable composition comprising prepolymers with a focused ultrasound beam. The focused ultrasound beam is characterized by a focal spot, the shape and dimensions of which are tunable (further described below). The energy of the focused ultrasound beam is greatest within its focal spot. This energy is used to induce polymerization reactions between prepolymers of the curable composition (i.e., induce curing), thereby forming polymer (i.e., resin) in a localized region of the curable composition defined by the location of the focal point. The cured, localized region may be referred to as a "cured region" of the curable composition.

The mechanism by which polymerization/curing is induced by the focused ultrasound beam depends upon the characteristics of the focused ultrasound beam (e.g., power, frequency) as well as the type of prepolymer (and other possible components) of the curable composition. For example, some energy of the focused ultrasound beam can be converted to heat which increases the temperature of the curable composition in the localized region. Sufficiently high temperatures can induce polymerization reactions between certain types of prepolymers to form polymer in the localized region. Sufficiently high temperatures can also generate free radicals and/or free ions from certain types of initiators which may be present in the curable composition. These free radicals/ions, in turn, initiate polymerization reactions between other types of prepolymers to form polymer in the localized region.

The focused ultrasound beam may also cause cavitation (formation, growth, and collapse of small bubbles) in the curable composition. High temperatures and pressures are associated with the collapsing bubbles. As noted above, an increase in temperature can induce polymerization reactions (either directly by heat or indirectly via generation of free radicals/ions). In addition, the collapsing bubbles result in hydrodynamic shear in the curable composition due to the rapid movement of solvent molecules into void spaces. Hydrodynamic shear exerts tensile forces on other types of initiators which may be present in the curable composition. Sufficiently great tensile forces can break chemical bonds in such initiators to generate free radicals/ions. This process may be referred to as a "mechanochemical effect." As noted above, free radicals/ions can initiate polymerization reactions between prepolymers to form polymer in the localized region.

Regardless of the polymerization/curing mechanism induced by the focused ultrasound beam, the focused ultrasound beam (i.e., the focal spot) and the curable composition may be moved relative to one another, so that multiple localized regions of the curable composition may be cured to form a larger, cured object, i.e., the resin object. The exact shape and dimensions of the resin object can be controlled by digital data corresponding to the desired resin object. However, by contrast to existing additive manufacturing methods, this relative movement may be carried out freely in full 3D space and need not be limited to fabricating two-dimensional (2D) cross-sections to build up a desired 3D resin object in a layer-by-layer fashion. In general, the only restriction in the relative movement is access of the curable composition to the focused ultrasound beam and minimizing exposure of cured regions to the focused ultrasound beam or the focal spot of the focused ultrasound beam. A computing device may be used to determine an appropriate propagation axis and an appropriate set of relative movements based on digital data corresponding to the desired resin object. This computing device may be a component of, or operably coupled to, a system for carrying out the present methods (e.g., see system 100 of FIGS. 1 and 2).

In embodiments, heat transfer out of a single localized region and the kinetics of exothermic polymerization may be sufficiently fast so that polymerization/curing can propagate in the curable composition to regions beyond the single localized region defined by the focal spot of the focused ultrasound beam. Thus, in some embodiments, relative movement of the focused ultrasound beam and the curable composition is not necessary to achieve polymerization/curing of a volume of the curable composition larger than the single localized region. (See Example 10.) Heat transfer may be controlled through selection of the properties of the focused ultrasound beam, e.g., focal spot, frequency, power. These properties are further described below. Kinetics of polymerization may be controlled through selection of components (and their amounts) in the curable composition, e.g., type/amount of prepolymer, type/amount of initiator, and type/amount of inhibitor. The curable composition is further described below.

As noted above, the curable composition exposed to the focused ultrasound beam comprises prepolymers. As used throughout the present disclosure, the term "prepolymer" encompasses the repeating units which make up a polymer such as monomers and oligomers. The term also encompasses individual polymer chains which become crosslinked through chemical reactions, including the chemical reactions described herein. The term also encompasses molecules which may be used to crosslink such individual polymer chains.

The types of prepolymers are not particularly limited. Prepolymers which may be used include those for which the polymerization/curing reactions are induced by heat as well as those which are polymerized/cured through free radical polymerization reactions, cationic polymerization reactions, or anionic polymerization reactions. In embodiments, the prepolymers are those which form the following polymers upon curing: polyurethanes, polyepoxides, silicones (e.g., polydimethylsiloxane (PDMS)). Such prepolymers may comprise certain functional groups, e.g., isocyanates, silanes, cyanate esters, trifluorovinylether, phenylethynyl, and polyamic acid. In embodiments, the prepolymers are those which form the following polymers upon curing: poly (meth)acrylates, poly (meth)acrylamides, vinyl polymers, polyvinylethers, polyvinylcarbazoles, polystyrenes, polythiols, etc. In embodiments, the prepolymers include those which form a hydrogel polymer upon curing. In embodiments, the prepolymers include those which form a thermoset polymer upon curing. Inorganic materials such as metal oxides used in their liquid form may also be used as prepolymers.

In embodiments, the prepolymers comprise (meth)acrylates. The (meth)acrylates may be poly (ethylene glycol) diacrylates or poly (propylene glycol) diacrylates, including those having a number average molecular weight ($M_n$) in a range of from 200 Da to 1000 Da, from 150 Da to 850 Da, or from 250 Da to 750 Da. Other suitable (meth)acrylates include 2-hydroxyethyl acrylate, 2-hydroxyethyl methacrylate, and bisphenol A ethoxylate dimethacrylate, including those having $M_n$ in a range of from 200 Da to 2000 Da, from 250 Da to 1500 Da, or from 250 Da to 500 Da. Amounts of the prepolymers may be used in the curable composition which are in a range of from 0.1 weight % to 100 weight %, from 0.5 weight % to 90 weight %, from 1 weight % to 75 weight %, from 0.1 weight % to 10 weight %, and from 50 weight % to 100 weight %. (Here, weight % refers to the (total weight of prepolymers)/(total weight of curable composition)*100.)

As noted above, an initiator may be present in the curable compositions in order to mediate the polymerization/curing reactions. Suitable initiators include those which are capable of generating free radicals/ions (cations or anions) upon exposure to heat, pressure, or hydrodynamic shear. Generally, initiators suitable for the present methods are not photoinitiators, which require light to generate the free radicals/ions. Thus, in embodiments, the curable composition is free of a photoinitiator. An illustrative suitable initiator is water. The focused ultrasound beam can induce the thermolysis of water molecules to produce hydroxyl radicals (free radicals) and hydrogen atoms. Peroxides and azo compounds are other types of illustrative initiators.

In embodiments, the initiator is a thermal initiator capable of generating free radicals/ions upon exposure to heat. Illustrative thermal initiators include water-soluble compounds such as potassium persulfate, ammonium persulfate, and VA 044. Other illustrative thermal initiators include organic-soluble (e.g., in acetone, ethyl acetate, ethanol) compounds such as azobisisobutyronitrile and benzoyl peroxide.

Sacrificial polymers and sacrificial oligomers are other types of initiators which may be used. (The term "sacrificial" is used to distinguish the polymer/oligomer from the prepolymer of the curable composition and the polymer formed therefrom.) As described above, hydrodynamic shear associated with cavitation can lead to the decomposition of such sacrificial polymers/oligomers into free radical fragments. The type of sacrificial polymer/oligomer is not particularly limited. Illustrative types include polyethylene glycol (PEG), polymethacry late (PMA), poly (methyl methacrylate) (PMMA), polystyrene, and polyamides (including polypeptides). Generally, the sacrificial polymer/oligomer has an average degree of polymerization of 300 or greater (i.e., $M_n$ of 30,000 Da or greater).

Amounts of the initiators may be used in the curable composition which are in a range of from 0.1 weight % to 1 weight %, from 0.2 weight % to 0.8 weight %, or from 0.3 weight % to 0.5 weight %. (Here, weight % refers to the (total weight of initiators)/(total weight of curable composition)*100.)

The curable composition may further comprise an inhibitor, a compound capable of inhibiting the formation of the free radicals/ions described above. Illustrative inhibitors include hydroquinone, monomethyl ether hydroquinone, and butylated hydroxytoluene. Amounts of the inhibitors may be used in the curable composition which are in a range of from 0.03 weight % to 0.3 weight %, from 0.05 weight % to 0.2 weight %, or from 0.05 weight % to 0.1 weight %. (Here, weight % refers to the (total weight of inhibitors)/(total weight of curable composition)*100.)

Combinations of different types of prepolymers and if present, combinations of different types initiators, and combinations of different types of inhibitors may be used in the curable compositions.

The curable composition may further comprise a fluid, e.g., a liquid. The fluid provides a medium for dispersing the prepolymers. A variety of types of fluids and combinations of fluids may be used. Selection may be guided by one or more factors including the following: ability to solubilize the prepolymers, including maximizing solubility; achieving a desired viscosity, e.g., greater viscosity may be useful to support and restrict movement of a cured object being fabricated as well as to reduce acoustic streaming and heat dissipation; and ability to generate free radicals/ions upon exposure to the focused ultrasound beam. In embodiments, the fluid is water. Water is capable of both solubilizing certain prepolymers such as (meth)acrylates and also functions as an initiator as described above. Polyethylene glycol ($M_n$=600 Da) and polyethylene glycol-polypropylene glycol-polyethylene glycol ($M_n$=1100 Da or 1900 Da) are liquids may also be useful to solubilize (meth)acrylate prepolymers. Alcohols (e.g., ethanol) and other organic solvents (e.g., acetone) may be used as the fluid.

Other additives may be present in the curable composition, e.g., catalysts.

In embodiments, the curable composition comprises or consists of a prepolymer, an initiator, a fluid, and optionally, one or more of an inhibitor and a catalyst. In these embodiments, a single type or multiple, different types of each of the prepolymer, the initiator, the fluid, the inhibitor, and the catalyst may be used.

The curable compositions may be made by mixing the prepolymers, fluid, initiators, inhibitors, additives, etc. at desired relative amounts. The relative amounts may be adjusted to facilitate curing (including tuning the kinetics of polymerization), to achieve a desired viscosity, to achieve certain properties of the fabricated object, etc. Illustrative amounts of the prepolymers, initiators, inhibitors have been provided above: generally, with the balance being the fluid.

The curable composition is generally a liquid, although curable compositions having various viscosities may be used. Generally, the viscosity of the curable composition is at least 15 cP. This includes a viscosity of at least 25 cP, at least 50 cP, at least 100 cP, or in a range of from 15 cP to 2000 cP, from 15 cP to 100 cP, or from 50 cP to 100 cP. As noted above, these viscosity values are useful to support and restrict movement of a cured object being fabricated as well as to reduce acoustic streaming and heat dissipation. The viscosity of the curable composition may refer to the viscosity measured at room temperature and using, e.g., a Tuning fork vibration viscometer.

In embodiments, a curable composition is provided as a curable composite comprising a porous material and any of the disclosed curable compositions dispersed therein. This embodiment is useful to address acoustic streaming and heat dissipation which can interfere with control of curing in the direction along the axis defined by the focused ultrasound beam. The porous material is composed of a solid matrix in the form of a branched, interconnected network that extends in three dimensions. By interconnected it is meant that a majority (or all) individual branches of the solid matrix are in contact with one or more neighboring branches. This means that the solid matrix is a unitary, free-standing structure and is distinguished from collections of discrete solid entities, e.g., fibers, particles, etc. The outer surfaces of the solid matrix define another network of pores distributed throughout the solid matrix. In the curable composite, the curable composition occupies, i.e., fills, these pores. Irradiation of the curable composite with the focused ultrasound beam converts the curable composition within the focal spot of the focused ultrasound beam to one or more cured regions of polymer as described above. However, in this embodiment, the solid matrix of the porous material is also present and remains after the irradiation (although this does not preclude the possibility of there being some chemical and/or physical changes to the porous material from the irradiation). Thus, the irradiated (cured) regions provide an interpenetrating network comprising the solid matrix of the porous material (one network) and the polymer polymerized from the curable composition (another network). These solid matrix/polymer networks are entangled (i.e., interlaced, interlocked) with one another. The entanglement is generally of a degree that the solid matrix and the polymer cannot be physically pulled apart from one another. This includes the networks being entangled on a molecular scale, i.e., at least some individual molecules of the solid matrix are entangled with individual chains of the polymer. Generally, the solid matrix and the polymer are not covalently bonded to one another. However, depending upon the porous material, the curable composition, and the irradiation conditions, some such covalent bonding may occur. Resin objects formed from the disclosed curable composites comprise the interpenetrating networks described above.

The composition of the porous material of the curable composite is not particularly limited. However, generally, the composition of the porous material is selected such that it is chemically inert with respect to the curable composition. In embodiments, the composition of the porous material may be selected to be sufficiently transparent to the focused ultrasound beam. By sufficiently transparent, it is meant that the percent transmission of the focused ultrasound beam through the solid matrix is at least 20%, at least 50%, at least 70%, at least 80%, or at least 90%. Illustrative materials for the porous material include resins (cured polymers) such as polyurethane and polyolefins. Other illustrative materials for the porous material include metals or metal alloys.

Similarly, the morphology, including the pore size of the porous material is not particularly limited. The average pore size may be no more than 1000 mm, no more than 500 10 mm to 500 mm, in a range of 10 mm to 1000 mm, from 10 mm to 500 mm, from 50 mm to 250 mm, or from 1 cm to 10 cm. The average pore size may be smaller than the focal spot of the focused ultrasound beam. Average pore size may be determined from SEM images as described in Example 4, below. Pores may be generally connected to each other so as to allow fluid to pass from one pore to another. A majority of the pores (e.g., greater than 50%) may be connected to each other. Such porous materials may be referred to as "open-cell" porous materials.

In embodiments, the porous material is a foam body (e.g., a polymer foam body such as a polyurethane foam body, or a metal foam body such as a nickel foam body). The outer shape and outer dimensions of the foam body are not particularly limited, but rather, may depend upon the desired application for the fabricated object. FIGS. 4, 5A-5C, the left images of 5E-5G, 9A, and 10A show polyurethane foam bodies in the form of rectangular blocks. Pore dimensions have been described above.

Figures 6A, 6B:
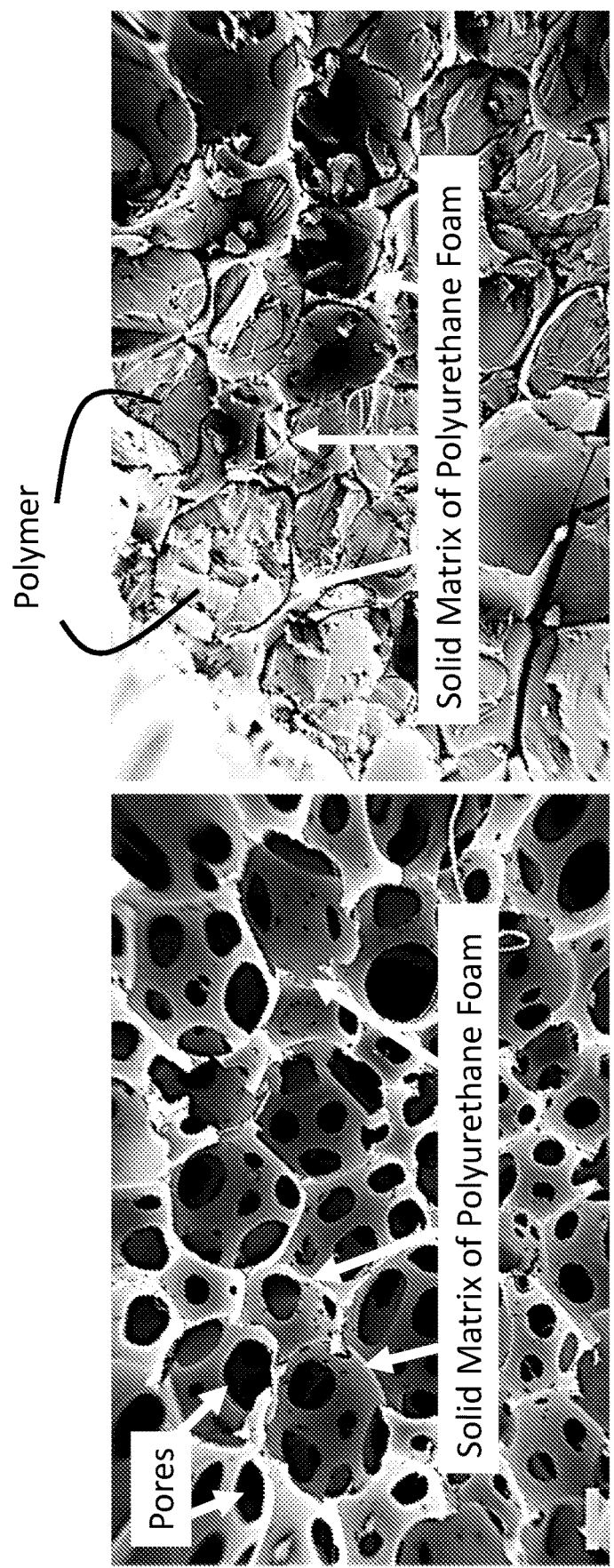
FIG. 6A shows a scanning electron microscope (SEM) cross-sectional image of a polyurethane foam body and FIG. 6B shows a SEM cross-sectional image of a composite resin object formed from a curable composite comprising the polyurethane foam body and a curable composition dispersed throughout the pores of the polyurethane foam body. In the composite resin object, the curable composition has been cured to form a polymer within the pores.

FIG. 6A shows a SEM image of a cross-section of an open-cell, polyurethane foam body that may be used as the porous material of a curable composite (also see Examples 3-8). This figure shows that the solid matrix of the polyurethane foam body is a branched, interconnected, unitary, free-standing network extending in three dimensions. Also shown is the network of interconnected pores defined by the outer surfaces of the solid matrix. FIG. 6B shows a SEM image of a cross-section of a resin object formed from a curable composite comprising the polyurethane foam body of FIG. 6A and a curable composition filling the pores thereof. Irradiation with a focused ultrasound beam was used to convert the curable composition to polymer, resulting in a resin object comprising an interpenetrating network comprising the solid matrix of the polyurethane foam body and the polymer entangled with one another.

The curable composite is formed by introducing the curable composition into pores of the porous material, which may be accomplished by a variety of techniques, e.g., injection, immersion, soaking, etc. Air trapped within the porous material after the curable composition has been introduced is generally removed prior to irradiation, e.g., by degassing the curable composite under vacuum at room temperature for, e.g., from 5 min to 60 min. This process may also be used to remove dissolved $O_2$ from the curable composition itself. Degassing may also be used in embodiments in which a porous material is not used, e.g., the curable composition itself may be degassed as described above prior to irradiation.

In embodiments in which a curable composite is used, the curable composite may be deformed during irradiation with the focused ultrasound beam. (See Example 9.) The deformation may include subjecting the curable composite to any type of force, e.g., compression, tensile, twisting, etc. However, in embodiments, the curable composite is not deformed during irradiation with the focused ultrasound beam. (See Examples 4-8.)

In embodiments, the curable composite comprises or consists of a porous material (e.g., a polymer foam body) and a curable composition dispersed therein. As noted above, the curable composition may comprise or consist of a prepolymer, an initiator, a fluid, and optionally, one or more of an inhibitor and a catalyst. In these embodiments, a single type or multiple, different types of each of the prepolymer, the initiator, the fluid, the inhibitor, and the catalyst may be used.

Figure 4:
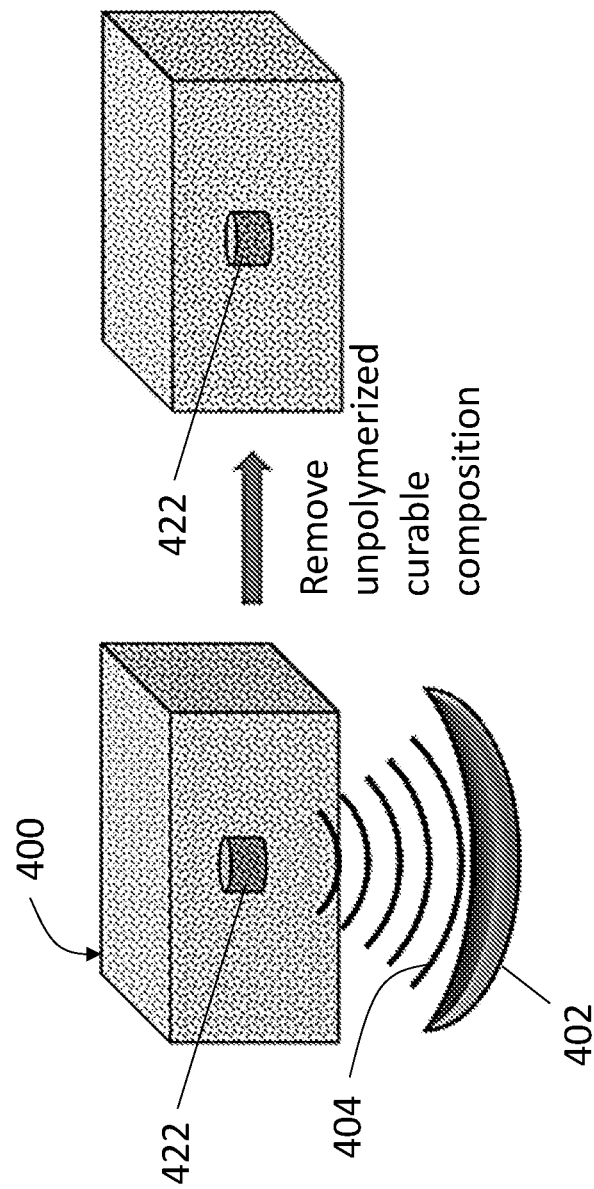
FIG. 4 shows a schematic of portions of a system similar to system 100 of FIG. 1, including a curable composite 400 (polyurethane foam body soaked with a curable composition) being irradiated with a focused ultrasound beam 404 from a transducer 402 to fabricate a composite resin object 422.
Figure 5A:
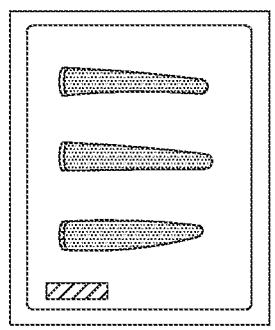
FIGS. 5A-5G show composite resin objects formed using curable composites similar to that shown in FIG. 4 and a system similar to that shown in FIG. 1. In the right images of FIGS. 5D-5G, portions of the polyurethane foam body have been removed from around the composite resin objects.
Figure 5B:
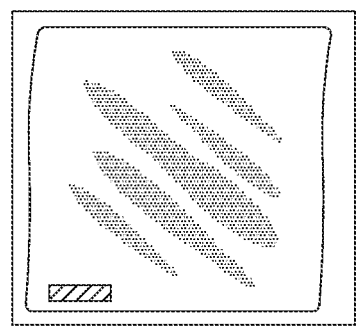
Figure 5C:
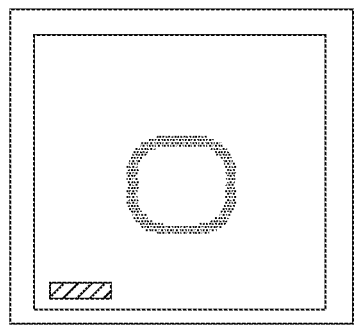
Figure 5D:
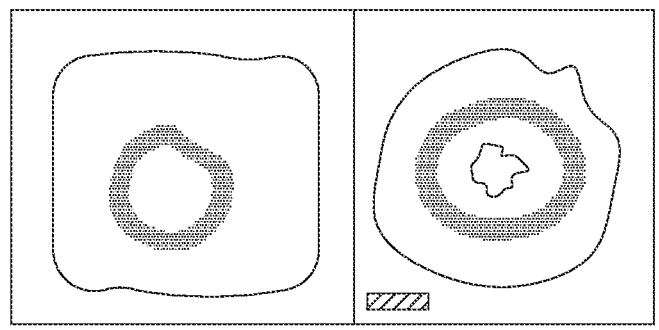
Figure 5E:
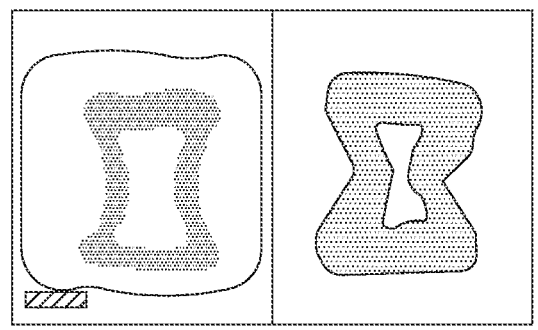
Figure 5F:
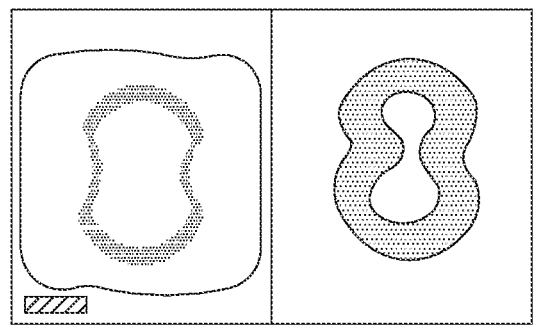
Figure 5G:
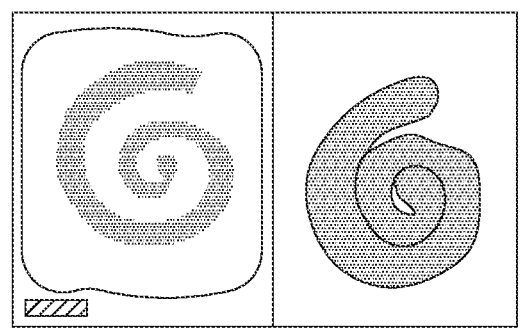

The phrase "focused ultrasound beam," as used in throughout the disclosure, refers to sound waves having a frequency greater than 20 KHz and which have been focused to a focal spot to increase the intensity of the sound waves at the focal spot as compared to the intensity of the sound waves emanating from a source of the sound waves. (The source may also be referred to as a probe or a transducer.) Various sources may be used, including commercially available sources. An illustrative source is a high intensity focused ultrasound (HIFU) transducer as shown in FIGS. 1 and 4. The focal spot is characterized by a shape and dimensions. These are tunable and depend upon the source as well as the use of other acoustic lenses and the like. By way of illustration, the focal spot of the HIFU transducer of FIG. 1 has an ellipsoidal shape and a length along the major axis of about 13 mm. More than one focused ultrasound beam may be used in the present methods, e.g., by using more than one source. The orientation of the propagation axis of each focused ultrasound beam may be adjusted with respect to one another to further tune the shape and dimensions of the focal spot in the curable composition as defined by overlapping, individual focal spots. In general, the focal spot may have an ellipsoidal (or spheroidal) shape and major axis (or diameter) in a range of from 1 mm to 50 mm. This includes from 5 mm to 25 mm and from 10 mm to 20 mm.

Figure 11:
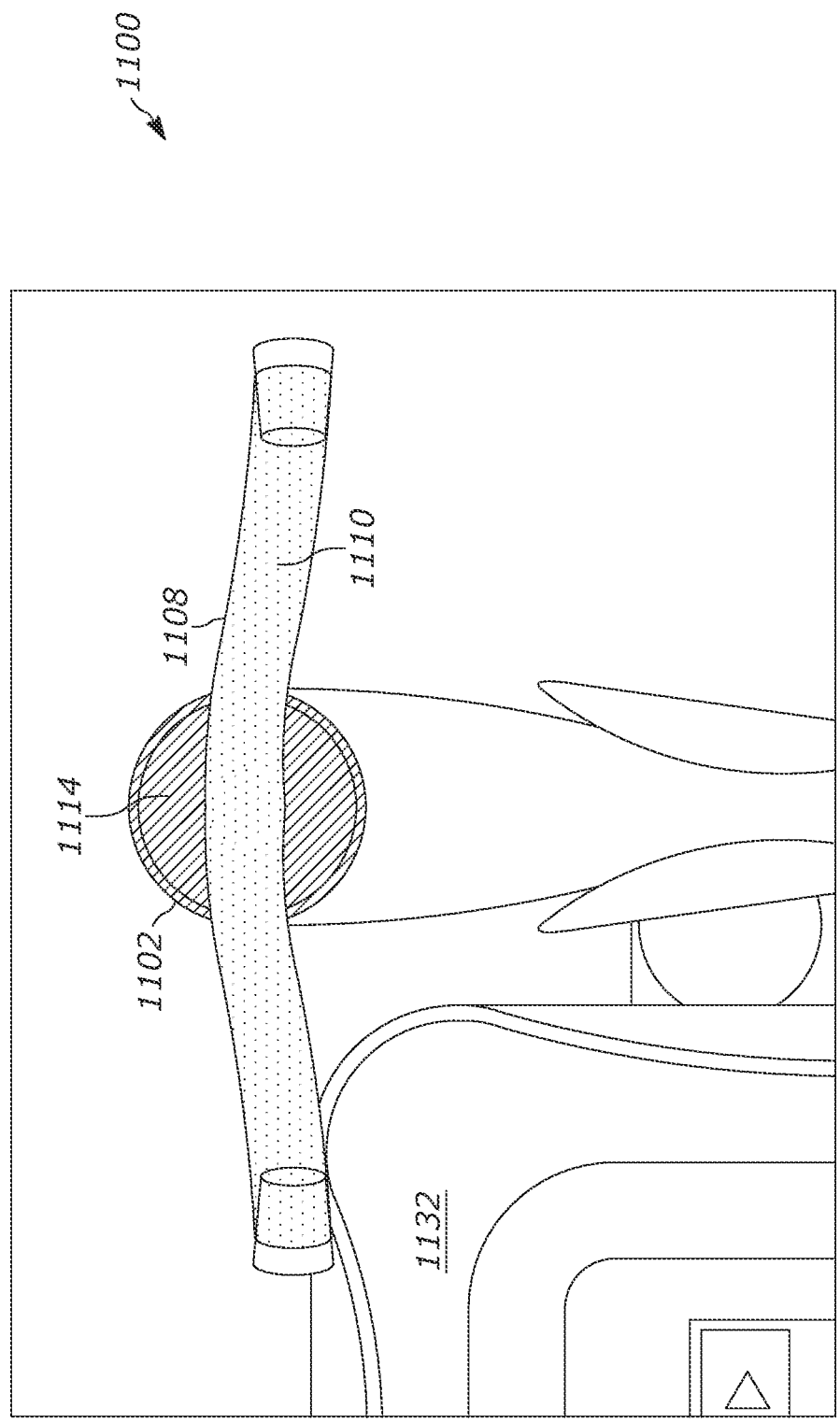
FIG. 11 shows another illustrative system 1100 which may be used to carry out the present methods.

Another illustrative source is a transducer of a portable ultrasound device, such as the transducer 1102 of the portable ultrasound device 1132 shown in FIG. 11 and further described in Example 10, below.

The focused ultrasound beam may be characterized by various properties including its frequency and power. These may be selected depending upon the desired polymerization/curing mechanism to be induced, the type of prepolymer, and the desired focal spot dimensions. Illustrative frequencies include from 800 kHz to 3000 kHz, from 800 kHz to 2000 kHz, from 800 kHz to 1000 kHz, from 800 kHz to 950 kHz, and from 880 kHz to 940 KHz. Illustrative powers include from 1 W to 500 W, from 10 W to 350 W, and from 100 W to 200 W. The focused ultrasound beam may be continuous or pulsed. If pulsed, the pulsed focused ultrasound beam may be characterized by a duty cycle (ratio of pulse width to period). Pulsed focused ultrasound beams may be useful to limit heating outside of the focal spot so as to improve resolution. In addition, the duty cycle may be adjusted to improve resolution. If more than one focused ultrasound beam is used, each of these properties may be selected independently for each focused ultrasound beam.

The total time of irradiation of the curable composition (or curable composite) by the focused ultrasound beam(s) may be adjusted depending upon the desired polymerization/curing mechanism to be induced and the type of prepolymer. The total time refers to the total time an individual, localized region in the curable composition is irradiated. Different localized regions may have the same or different total times of irradiation. However, in embodiments as noted above, a single, localized region may be irradiated which results in propagation of the polymerization beyond the single, localized region, including through the entire volume of the curable composition (or curable composite).

The objects fabricated by the present methods may be characterized by their composition. In embodiments in which a porous material is not used, the fabricated object comprises (or consists of) a polymer, i.e., the polymerization product of the prepolymers, initiators, etc., in the curable composition. In these embodiments, the fabricated object is generally non-porous and solid.

In embodiments in which a porous material is used, the resin object comprises (or consists of) the polymer as well as at least some of the solid matrix of the porous material embedded throughout the polymer. As noted above, the surfaces of the solid matrix of the porous material define pores distributed throughout the solid matrix. In the fabricated object, at least some of this solid matrix remains, wherein the cured curable composition (i.e., the polymer) occupies these pores. This is demonstrated in FIG. 6B (SEM image of a cross-section of polymer and solid matrix of polyurethane foam embedded in the polymer), FIG. 13 (ATR-IR spectra confirming the presence of urethane bonds from the polyurethane foam body in the fabricated object), and further described in Example 4, below. As used throughout the present disclosure, the term "embedded" refers to the referenced material (e.g., the solid matrix) being surrounded on one or more (including all) surfaces in another referenced material (e.g., the polymer). Thus, the embedding may be partial or full. In embodiments in which a porous material is used, the resin object is also generally non-porous and solid because the cured curable composition (polymer) has filled the pores of the porous material. However, depending upon the desired application, porous material (with unfilled pores) may remain to surround and embed the resin object. As described above, resin objects fabricated from curable composites (which comprise both the curable composition and the porous material) may also be described as comprising an interpenetrating network of the solid matrix of the porous material and the polymer polymerized from the curable composition.

In embodiments, objects fabricated by the present methods comprise distinct regions, e.g., distinct layers, each region (layer) comprising a different polymer. The different polymers may be covalently bound to one another at the interface formed between the regions (layers) of different polymers. Such objects may be fabricated from curable composites as described in Example 5, below. (See also, FIGS. 7A and 7B.)

In the present disclosure, the terms "object" and "resin object" may be used in reference to both objects formed from curable compositions without porous materials as well as to those formed from curable composites. For clarity, the terms "composite object" and "composite resin object" may be used in reference to objects formed from curable composites. Only resin objects fabricated from curable composites (which comprise both the curable composition and the porous material) may also be described as comprising an interpenetrating network of the solid matrix of the porous material and the polymer polymerized from the curable composition. All objects/composite objects described herein are also encompassed by the present disclosure.

The shape and dimensions of the objects fabricated by the present methods are not particularly limited, but rather, depend upon the desired application.

Objects fabricated by the present methods need not be (although they can be) subjected to any desired post-processing steps. In embodiments, the polymer of the object is fully cured, e.g., has a gel fraction of greater than 95%. In other embodiments, the polymer is partially cured and the object may be subjected to a post-curing step, e.g., heating in an oven. In embodiments, after fabrication, the object may be removed from a container used to contain the curable composition/curable composite during fabrication. However, in other embodiments, this is not necessary, e.g., in embodiments in which the container is desired as part of the fabricated object. (See Example 10, below.)

In embodiments in which a curable composite is used, after fabrication, unpolymerized curable composition may be removed from the porous material, e.g., by squeezing, rinsing, etc. In embodiments in which a curable composite is used, after fabrication, some or all of the porous material (with unfilled pores) surrounding the fabricated composite object may be removed, e.g., by cutting away. (See the right images in FIGS. 5D-5G.)

In embodiments, a composite resin object comprises (or consists of) a foam body (e.g., a polymer foam body) having a solid matrix defining pores distributed throughout the solid matrix; and a resin object comprising (or consisting of) a polymer, wherein the resin object is embedded within the foam body such that the polymer fills at least some pores of the foam body and at least some solid matrix is embedded in the polymer. This embodiment is illustrated in FIGS. 5A-5G showing resin objects having different shapes and dimensions which are embedded in polyurethane foam bodies. Generally, the polyurethane foam body has a different shape and different dimensions than the resin object embedded therein. in these embodiments, the polyurethane foam bodies are generally in the form of rectangular blocks having outer dimensions which are greater than the resin objects embedded therein (i.e., the embedded resin objects have one or more outer dimensions that are smaller than the polyurethane foam block). Although the embedded resin objects are solid and non-porous, they are at least partially surrounded by the porous polyurethane foam body (with unfilled pores). However, as shown in the right images of FIGS. 5D-5G, in embodiments, at least some of the unfilled polyurethane foam body may be cut away from the resin object. In each of the embodiments described in this paragraph, the embedded resin objects themselves may each be described as comprising (or consisting of) an interpenetrating network of the solid matrix of the porous material and the polymer entangled with one another.

Figure 9A:
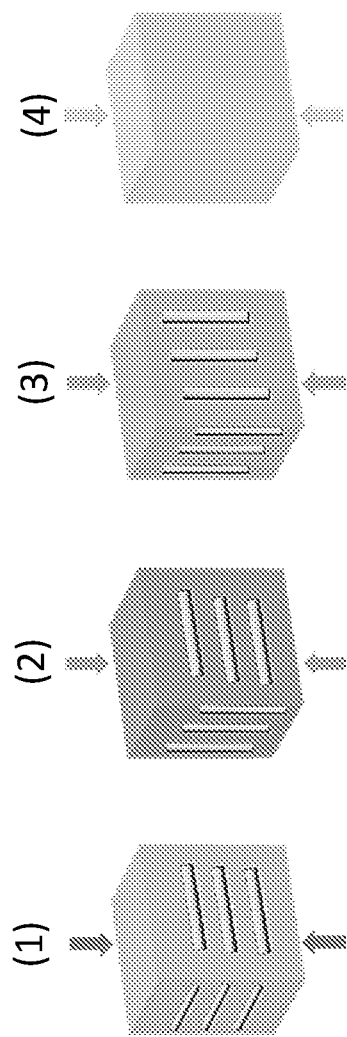
FIG. 9A show schematics of three composite resin objects (1, 2, 3) fabricated using a system similar to system 100 of FIG. 1 and a comparative object (4) which is a similarly sized cubic shaped polyurethane foam (no curable composition and no curing). The arrows indicate the compressive force applied to the objects to generate the plot of FIG. 9B showing compressive stress versus compressive strain.
Figure 10A:
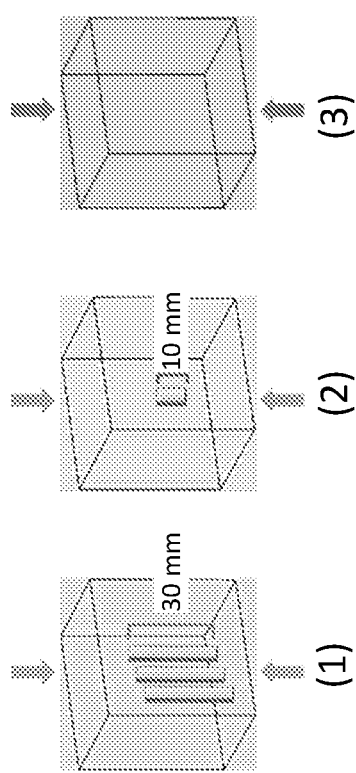
FIG. 10A show schematics of two composite resin objects (1, 2) fabricated using a system similar to system 100 of FIG. 1 and a comparative object (3) which is a similarly sized cubic shaped polyurethane foam (no curable composition and no curing). The arrows indicate the compressive force applied to the objects to generate the plot of FIG. 10B showing compressive stress versus compressive strain for the objects 1-3.

In embodiments, a composite resin object comprises (or consists of) a foam body (e.g., a polymer foam body) having a solid matrix defining pores distributed throughout the solid matrix; and a plurality of resin objects separated from one another, wherein each resin object of the plurality comprises (or consists of) a polymer and is embedded within the foam body such that the polymer fills at least some pores of the foam body and at least some solid matrix is embedded in the polymer. Each resin object of the plurality may comprise the same type of polymer or different resin objects of the plurality may comprise different types of polymers. Embodiments of this paragraph are illustrated in FIG. 9A showing composite resin objects 1-3, each comprising a plurality (3) of embedded resin objects in the form of cylindrical rods and in FIG. 10A showing composite resin object 1, comprising a plurality (3) of embedded resin objects in the form of cylindrical rods. In each of these embodiments, the embedded resin objects themselves may each be described as comprising (or consisting of) an interpenetrating network of the solid matrix of the porous material and the polymer entangled with one another.

Figure 7B:
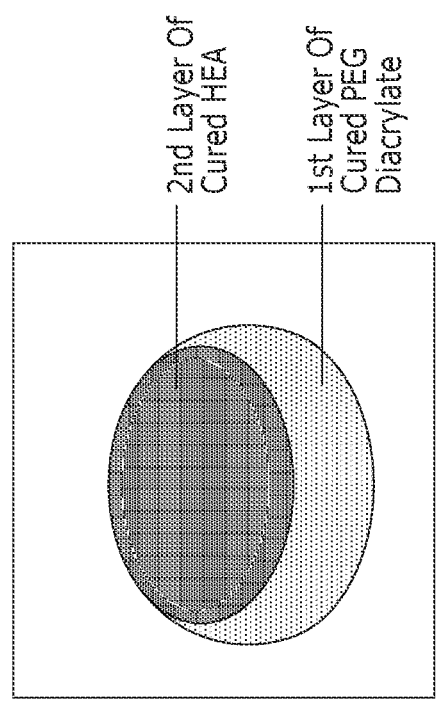
FIG. 7B shows a schematic of a fabricated multilayer composite resin object in the form of a cylinder, composed of a first layer of cured PEG diacrylate, and a second layer of cured 2-hydroxyethyl acrylate (HEA) adhered to the first layer.

In embodiments, a resin object may comprise a first region of a first polymer and a second region of a second, different polymer. The two regions may be in contact with one another at an interface formed between the regions of different polymers. This embodiment is illustrated in FIG. 7B in which the first region is in the form of a first layer of cured poly (ethylene glycol) diacrylate (PEG diacrylate) and the second region is in the form of a second layer of cured 2-hydroxyethyl acrylate (HEA). In other embodiments, more than two regions may be used, in which each region comprises a different polymer. In embodiments, the resin object itself comprises an interpenetrating network of the solid matrix of a porous material and each of the different polymers being used. The interpenetrating network may have a first region in which the solid matrix and the first polymer are entangled and a second region in which the solid matrix and the second polymer are entangled.

Nonlimiting applications for objects fabricated by the present methods include orthotics, prostheses, soft robotics, overmolded parts or composite bridges between foam pieces.

The present methods may be carried out using a variety of systems, but an illustrative system 100 is shown in FIG. 1. The system 100 comprises a source 102 configured to provide a focused ultrasound beam 104. In this embodiment, the source 102 is a HIFU transducer. The HIFU transducer focuses ultrasound to a focal spot 106. The system 100 further comprises a container (or vat) 108 configured to contain a curable composition 110 (or curable composite) from which a desired object is to be fabricated. The container 108 has one or more walls 112 configured to transmit the focused ultrasound beam 104. In other words, the wall 112 has dimensions and is formed of a material to transmit the focused ultrasound beam through the wall 112 (e.g., with a percent transmission of at least 20%, at least 50%, at least 70%, at least 80%, or at least 90%). Illustrative materials include plastics such as Mylar; metal; glass; and rubber. In this embodiment, the source 102 is spaced apart from the wall 112 and does not contact (i.e., is not in direct contact) with the wall 112 or the curable composition 110.

A coupling fluid 114 may be used to facilitate transmission of the focused ultrasound beam 104 from the source 102 to the curable composition 110 and minimize reflections at the wall 112. Selection of the coupling fluid 114 depends upon the composition of the wall 112 and composition of the curable composition 110. The coupling fluid 114 is generally selected so as to minimize the mismatch in acoustic impedance between the coupling fluid 114, the wall 112, and the curable composition 110. Acoustic impedance is equal to density times acoustic velocity. For example, if the curable composition 110 comprises water as a fluid/initiator, the coupling fluid 114 may be water. Other coupling fluids may be used, e.g., commercially available ultrasound gels such as Konix R Sterile Gel. Ultrasound gels may be composed of ingredients such as a gelling agent (e.g., crosslinked polyacrylic acid), a pH adjuster (e.g., triethanolamine), a preservative (e.g., methylisothiazolinone), an excipient (e.g., propylene glycol), and deionized water. It may be useful to degas the coupling fluid prior to carrying out the present methods, e.g., by using an ultrasonic degasser for from 1 to 4 hours as described in the Examples, below.

The system 100 further comprises a moveable framework 116, e.g., a gantry. In this embodiment, the moveable framework 116 is configured to move the source 102/focal spot 106 relative to the container 108/curable composition 110, but other configurations that achieve relative translation of the focal spot 106 and the curable composition 110 may be used. Illustrative speeds of relative movement include from 1 mm/s to 15 mm/s. Different speeds may be used during fabrication of an object, e.g., to form different regions of the object. The system 100 further comprises a second container 120 mounted to the moveable framework 116 and configured to contain the coupling fluid 114.

The panel on the right in FIG. 1 illustrates operation of the system 100 to fabricate a 3D resin object 122. The focused ultrasound beam 104 irradiates the curable composition 110 comprising prepolymers 126 and water 128. At the focal spot 106, the focused ultrasound beam generates free radicals 130 (due to the thermolysis of the water 128, but initiators may also be included in the curable composition 110) which initiate free radical polymerization reactions with the prepolymers 126 to form polymer 132 in a localized region of the curable composition defined by the location of the focal spot 106. The focal spot 106 may be moved within the curable composition 110 to form additional cured regions and fabricate the 3D resin object 122.

Figure 2:
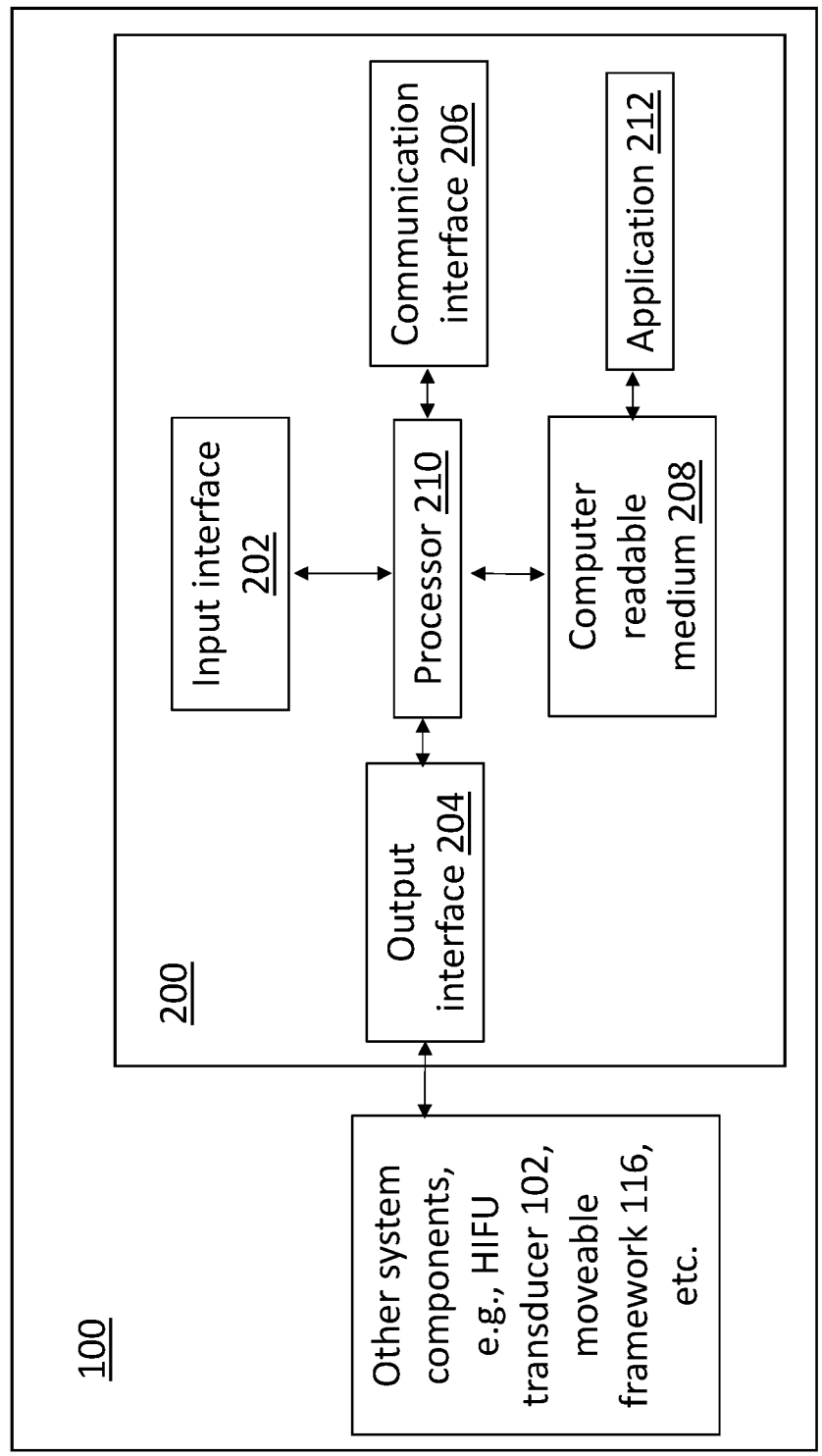
FIG. 2 shows a block diagram showing other components of the illustrative system 100 which may be used to carry out the present methods.
Figure 3:
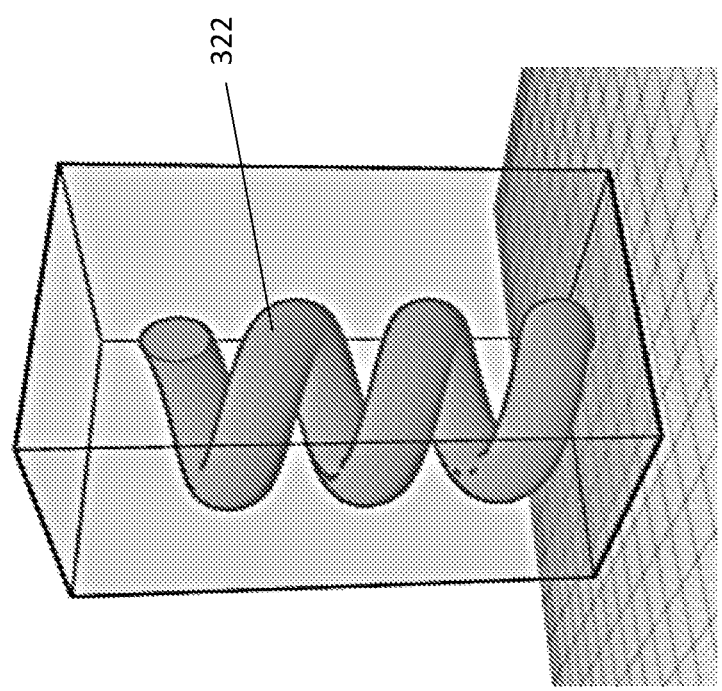
FIG. 3 shows an illustrative resin object 322 which may be fabricated using the present methods.

It is noted that system 100 is merely illustrative and systems for carrying out the present methods may include additional, fewer, and/or different components as compared to those shown in FIG. 1. Regarding such additional components, other acoustic, mechanical, and/or electrical assemblies/devices/subsystems may be used. An imaging transducer may be included to monitor curing. As shown in FIG. 2, a controller 200 configured to control one or more components of the system 100 may be included. The controller may be integrated into the system as part of a single device or its functionality may be distributed across one or more devices that are connected to other system components directly or through a network that may be wired or wireless. A database, a data repository for the system, may also be included and operably coupled to the controller. Such a controller may include an input interface 202, an output interface 204, a communication interface 206, a computer-readable medium 208, a processor 210, and an application 212. The controller 200 may be a computer of any form factor including an electrical circuit board. Regarding the application 212, it performs operations associated with controlling other components of the system 100. Some of these operations may include receiving and/or processing digital data to be used during fabrication of the object. The digital data includes information relating to the desired shape and dimensions of the object. However, as noted above, processing the digital data need not require slicing the digital data into 2D cross-sections. Other of these operations may include controlling components of the system 100 based on the digital data. Another operation may include comparing an x. y. z curing position (particularly the dimension along the axis defined by the focused ion beam)

to calibration data. Some or all of the operations described in the present disclosure may be controlled by instructions embodied in the application 212.

It is noted that devices including the processor referenced above, the computer-readable medium operably coupled to the processor, the computer-readable medium having computer-readable instructions stored thereon that, when executed by the processor, cause the device to perform any of the operations described above (or various combinations thereof) are encompassed by the disclosure. The computer-readable medium is similarly encompassed.

Other systems may be used for carrying out the present methods. Another illustrative system 1100 is shown schematically in FIG. 11. The system 1100 comprises a source 1102 configured to provide a focused ultrasound beam, i.e., the transducer of a portable ultrasound device 1132. A flexible plastic tube 1108 is used as a container configured to contain a curable composition 1110. The source 1102 is spaced apart from the flexible plastic tube 1108 and does not contact (i.e., is not in direct contact) with the tube 1108 or the curable composition 1110. A coupling fluid 1114 (in this embodiment, an ultrasound gel), is positioned between the source 1102 and the flexible plastic tube 1108. Notably, system 1100 does not include a moveable framework (although relative movement of the source 1102 and the flexible plastic tube 1108 may be accomplished manually). Similarly, system 1100 does not include a second container for containing the coupling fluid 1114. Use of system 1100 to form an object 1200 (see FIG. 12) is described in Example, 10, below.

Because the present methods can induce curing without light and because the focused ultrasound beam is capable of penetrating many materials, the methods may be used to fabricate objects within bodies which are inaccessible to light and/or potentially harmed by light. (The phrase "inaccessible to light" may refer to the body having a percent transmission of no more than 1% to ultraviolet light, visible light, or both.) By way of illustration, the methods may be used to fabricate objects in situ within a device or machine. As another example, the methods may be used to fabricate objects (e.g., implants) in vivo in a subject, e.g., a human subject. In such a method of forming an implant, any of the disclosed curable compositions may be injected into the subject at a desired location and the focused ultrasound beam moved relative to the subject to cure the curable composition within the subject to fabricate the desired implant.

EXAMPLES

Example 1

3D resin objects were fabricated from curable compositions using system 100 of FIG. 1. The frequency of the HIFU transducer was 913 kHz. Deionized water was used as the coupling fluid and the HIFU transducer was immersed therein. A glass vat, also immersed in the coupling fluid, was used to contain the curable composition. A curable composition comprising polyethylene glycol (PEG) diacrylate ($M_w$~700) was dissolved in deionized water. Ratios of PEG diacrylate:water of from 1:9 to 3:7 were used. Discrete spherical dots of polymer were fabricated in these curable compositions using 100% duty cycle (continuous beam), 73 W power, and an irradiation time of about 30 seconds.

Example 2

Another curable composition (commercially available Sylgard 184) comprising a silicone elastomer base and silicone elastomer curing agent, mixed in a ratio of 10:3 was used. Discrete spherical dots of polymer were fabricated using 100% duty cycle (continuous beam), 73 W power, and an irradiation time of about 100 seconds. Higher powers reduced the irradiation time necessary to induce curing. For example, 400 W power cured the dots in less than 5 seconds. Other 3D resin objects, including blocks, springs, and other patterns were formed in the curable compositions by moving the HIFU transducer relative to the glass vat.

Example 3

A curable composite formed from a polyurethane foam body and a curable composition dispersed therein was used to fabricate composite 3D resin objects using a system similar to system 100 of FIG. 1. However, in this case, the vat was composed of metal. The curable composition was formed from PEG diacrylate ($M_n$~700 Da) and an aqueous initiator solution. The initiator solution was formed by dissolving 1 g potassium persulfate and 0.1 g hydroquinone in deionized water. The ratio of PEG diacrylate to initiator solution was 6 g:1 mL. The polyurethane foam body was fully soaked with the curable composition and any air remaining was removed. Single dots of hydrogel polymer were fabricated in the curable composite using 100% duty cycle, 60 W power, and an irradiation time of about 45 seconds. Using 100% duty cycle, 210 W power, continuous lines were drawn by moving the vat containing the curable composite at a speed of 2 mm/s. After formation of the composite resin object, any remaining unpolymerized curable composition was squeezed out of the foam body or rinsed with a solvent.

Example 4

Curable composites formed from a polyurethane foam body and a curable composition dispersed therein were used to fabricate various 3D composite resin objects using a system similar to system 100 of FIG. 1. In this Example, however, the side walls of the vat were composed of metal, and the bottom wall of the vat was composed of a polyester film (0.05-mm thick PET from CS Hyde Company). The coupling fluid was deionized water, which was degassed using an ultrasonic degasser for from 1 to 4 hours, prior to carrying out the irradiation.

Curable compositions were formed from PEG diacrylate ($M_n$~700), an aqueous initiator solution, and a radical inhibitor. The initiator solution was formed by dissolving 0.5 g to 0.7 g potassium persulfate and 0.08 g to 0.2 g hydroquinone in 20 mL of deionized water. Then 120 g of PEG diacrylate was dissolved in the initiator solution. The ratio of PEG diacrylate to initiator solution was 6 g:1 mL. The polyurethane foam body was an open-cell polyurethane foam body having an average pore size of 177±44 mm (as measured from analyzing 30 individual pores of a scanning electron microscope (SEM) image of a cross-section of the polyurethane foam body using ImageJ software). The polyurethane foam was purchased from Grainger (item #5GCX4). For each composite, the polyurethane foam body was fully soaked with the curable composition and the soaked foam was degassed under vacuum at room temperature for from 5 to 60 minutes, prior to carrying out the irradiation.

FIG. 4 shows a schematic of portions of the system 100 of FIG. 1 used for the fabrication, including a curable composite 400 (polyurethane foam body soaked with the curable composition) being irradiated with a focused ultrasound beam 404 from a HIFU transducer 402 to fabricate a composite resin object 422.

Various composite 3D resin objects, the schematics of which are shown in FIGS. 5A-5G, were fabricated. The frequency of the focused ultrasound beam was 913 kHz, the duty cycle was 100%, and powers of from 10 W to 500 W were used. Distances of from 1 cm to 6 cm between the bottom of the vat and the HIFU transducer were used. The distance between the focal spot and the HIFU transducer 402 was about 5 cm. Fabrication was conducted while the gantry, controlled by geode, was moved at speeds of from 1 to 15 mm/second. After fabrication, each object was removed from the vat and any unpolymerized curable composition was removed from the polyurethane foam body and the foam body washed with solvent (i.e., water) (see right image in FIG. 4). In some cases (i.e., FIG. 5D-5G) some of the polyurethane foam body was removed by cutting it away from the composite resin object. The composite resin object itself is composed of the cured curable composition (the polymer) as well as at least some of the solid matrix of the polyurethane foam body, now embedded throughout the polymer. The composite resin object itself may be described as comprising an interpenetrating network of the solid matrix of the polyurethane foam body and the cured PEG diacrylate.

The morphologies of the polyurethane foam body and the composite resin object are shown in the SEM cross-sectional images of FIG. 6A (polyurethane foam body) and FIG. 6B (composite resin object). The image of the composite resin object shows that at least some of the solid matrix of the polyurethane foam body becomes embedded within the resin. This embedded solid matrix is a structural network that renders the resulting composite resin object with unique mechanical properties as compared to polymer without the embedded solid matrix. Portions of the solid matrix of the polyurethane foam body, some pores, and regions of polymer of the composite resin object are labeled in FIGS. 6A and 6B.

Figure 13:
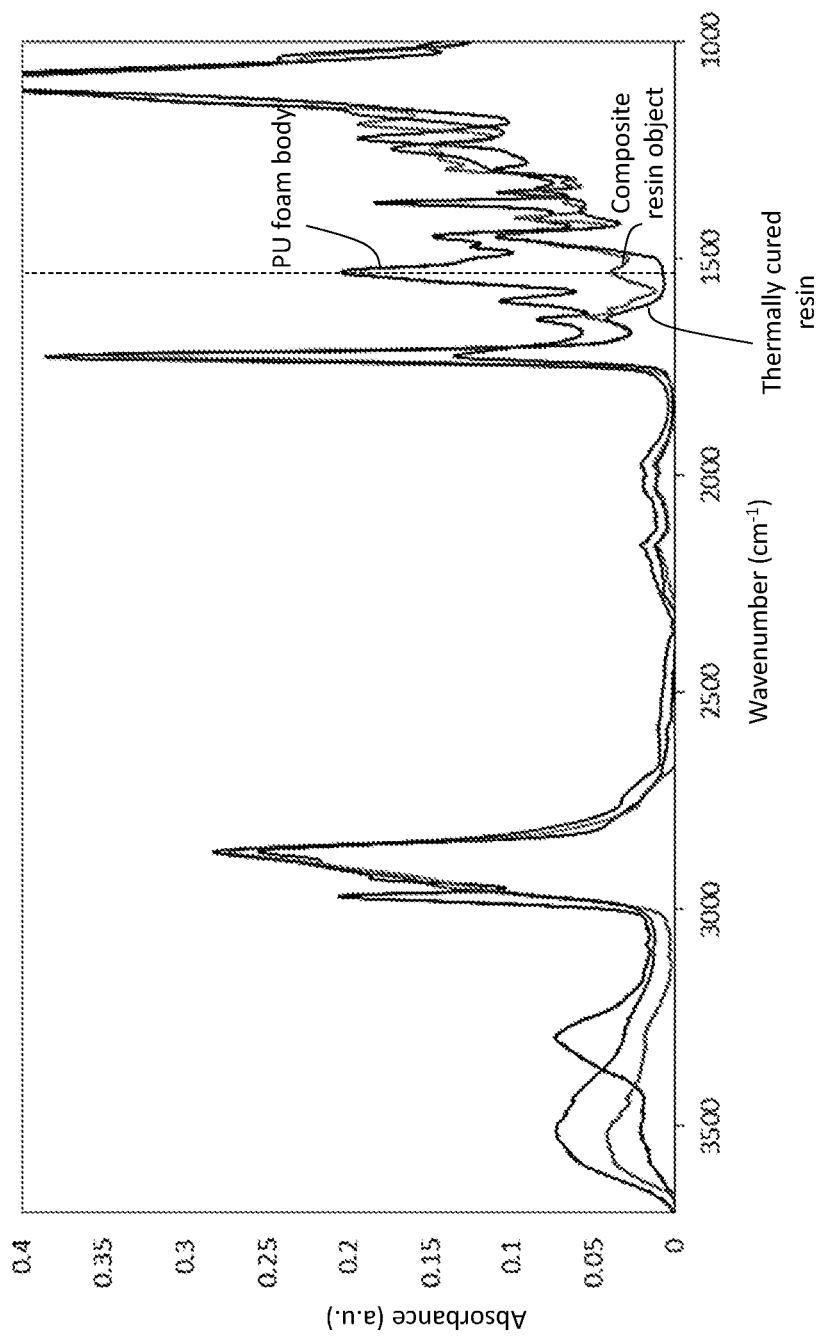
FIG. 13 shows attenuated total reflectance-infrared (ATR-IR) spectra of a polyurethane foam body, a composite resin object, and a comparative cured resin object (no polyurethane foam body) were obtained.

ATR-IR spectra of the polyurethane foam body, one of the composite resin objects, and a comparative cured resin object (no polyurethane foam body) were obtained. The results are shown in FIG. 13. The amide II band associated with N-H bond bending and C-N bond stretching in urethane bonds was observed at 1533 $cm^{-1}$ (labeled with dotted line) for both the polyurethane foam body and the composite resin object. However, the amide II band was not observed in the comparative cured resin object. The results confirm that at least a portion of the solid matrix of the polyurethane foam body remains present in the composite resin object.

Example 5

In this Example, multilayer composite resin objects were fabricated. First, experiments similar to those described in Example 4 were carried out to form composite resin objects from a polyurethane foam body soaked with a curable composition (based on PEG diacrylate as described in Example 4). After irradiation, the composite resin object was removed from the vat and any unpolymerized curable composition was removed from the polyurethane foam body. Next, the composite resin object (having a portion of the pores of the polyurethane foam body now filled with polymer) was soaked in a second curable composition so as to fill remaining open pores of the polyurethane foam body with the second curable composition. For some samples, the second curable composition was the same as the initial curable composition, but included an added dye to visually distinguish the second curable composition. For other samples, the second curable composition was different from the initial curable composition, e.g., a different prepolymer was used, and also included an added dye to visually distinguish the second curable composition. Next, irradiation with the focused ultrasound beam was carried out to cure regions of the second curable composition in the polyurethane foam body.

Figure 7A:
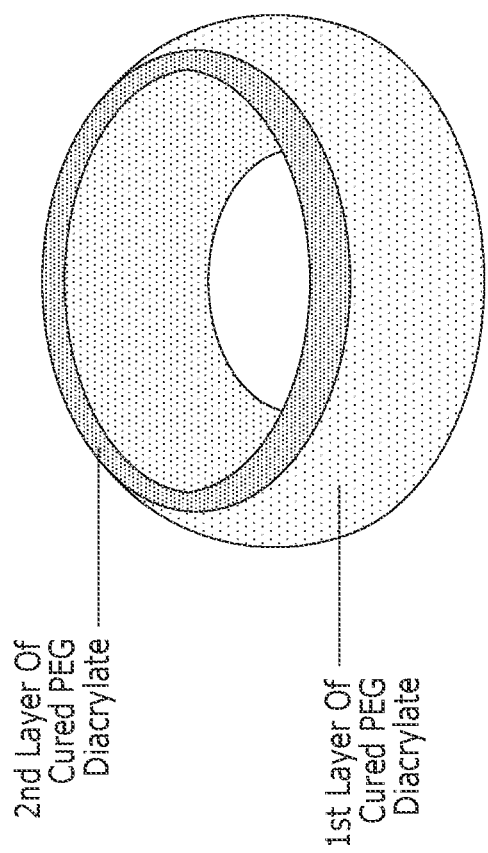
FIG. 7A shows a schematic of a fabricated multilayer composite resin object in the form of a ring, composed of a first layer of cured PEG diacrylate, and a second layer of cured PEG diacrylate adhered to the first layer.

FIG. 7A shows a schematic of a fabricated multilayer composite resin object in the form of a ring, composed of a first layer of cured PEG diacrylate, and a second layer of cured PEG diacrylate adhered to the first layer. Some polyurethane foam body has been cut away from around the ring, but the solid matrix of the polyurethane foam body remains embedded within the ring itself, i.e., throughout the two layers. FIG. 7B shows a schematic of a fabricated multilayer composite resin object in the form of a cylinder, composed of a first layer of cured PEG diacrylate, and a second layer of cured 2-hydroxyethyl acrylate (HEA) adhered to the first layer. Again, some of the polyurethane foam body has been cut away from around the cylinder, but the solid matrix of the polyurethane foam body is embedded within the cylinder, i.e., throughout the two layers. In both cases, a strong interface was formed between the two layers, believed to be due to covalent bonds formed between the layers during fabrication. The multilayer composite resin object of FIG. 7A has uniform, isotropic mechanical properties since both layers were formed from the same PEG diacrylate-based curable composition. However, the multilayer composite resin object of FIG. 7B has nonuniform, anisotropic mechanical properties since the softer HEA layer was more compressible than the harder PEG diacrylate layer.

Example 6

Figure 8:
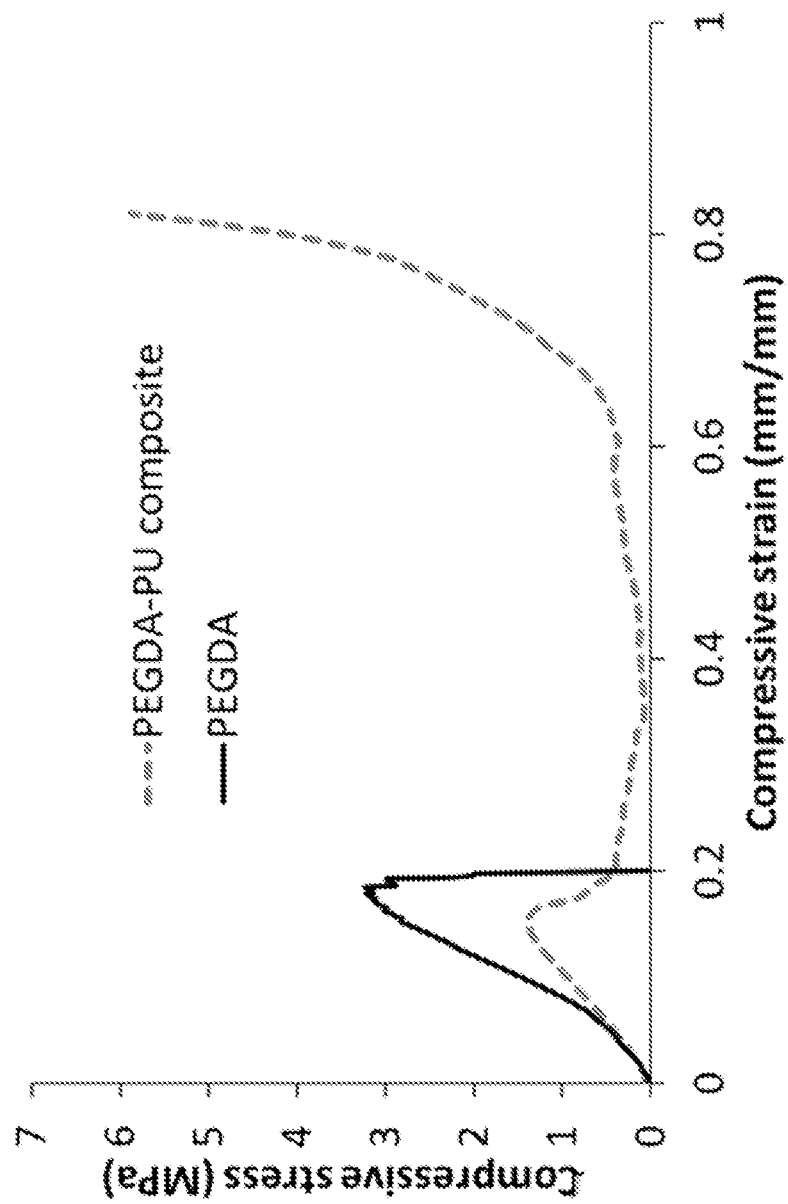
FIG. 8 shows a plot of compressive stress versus compressive strain for a composite resin object (dotted line) fabricated using the present methods as well for a comparative resin object (solid line) formed by thermally curing (no focused ultrasound beam) a curable composition into a similarly sized cubic shaped object.

In this Example, experiments similar to those described in Example 4 were carried out to form a composite resin object from a polyurethane foam body soaked with a curable composition (based on PEG diacrylate as described in Example 4). The fabricated composite resin object was cylindrical-shaped and composed of cured PEG diacrylate and a polyurethane foam body embedded therein. Compressive stress tests were performed on the composite resin object. The plot of compressive stress versus compressive strain is shown in FIG. 8 for the composite resin object (dotted line) as well for a comparative resin object (solid line) formed by thermally curing (no focused ultrasound beam) the curable composition into a similarly sized cylindrical-shaped object. Thus, the comparative resin object does not have any polyurethane foam body embedded therein. The compressive modulus was 6.3±1.3 MPa for the composite resin object and 9.4±0.7 MPa for the comparative resin object. The results show that composite resin objects become tougher with longer strain at break (>80%) while the comparative resin only objects (no polyurethane foam) shattered at 20% strain.

Example 7

In this Example, experiments similar to those described in Example 4 were carried out to form composite resin objects from a polyurethane foam body soaked with a curable composition (based on PEG diacrylate as described in Example 4). Three fabricated composite resin objects are shown schematically in FIGS. 9A and labeled 1, 2, and 3. In each case, the soaked polyurethane foam body was irradiated with the focused ultrasound beam to form three parallel lines of cured PEG diacrylate on each side face of the soaked polyurethane foam body. For composite resin object 1, the three parallel lines on each side face were oriented parallel to the top and bottom faces of the polyurethane foam body (and parallel to a subsequently applied compressive force, shown with arrows). For composite resin object 3, the three parallel lines on each side face were oriented perpendicular to the top and bottom faces of the polyurethane foam body (and perpendicular to a subsequently applied compressive force, shown with arrows). For composite resin object 2, the three parallel lines on each of two side faces were oriented parallel to the top and bottom faces and the three parallel lines on each of the other two side faces were oriented perpendicular to the top and bottom faces. For composite resin objects 1-3, after fabrication and prior to compressive tests descried below, unpolymerized curable composition was removed from the polyurethane foam bodies. A comparative object 4 is a similarly sized cubic shaped piece of polyurethane foam without any curable composition therein (and thus, without any cured curable composition).

Figure 9B:
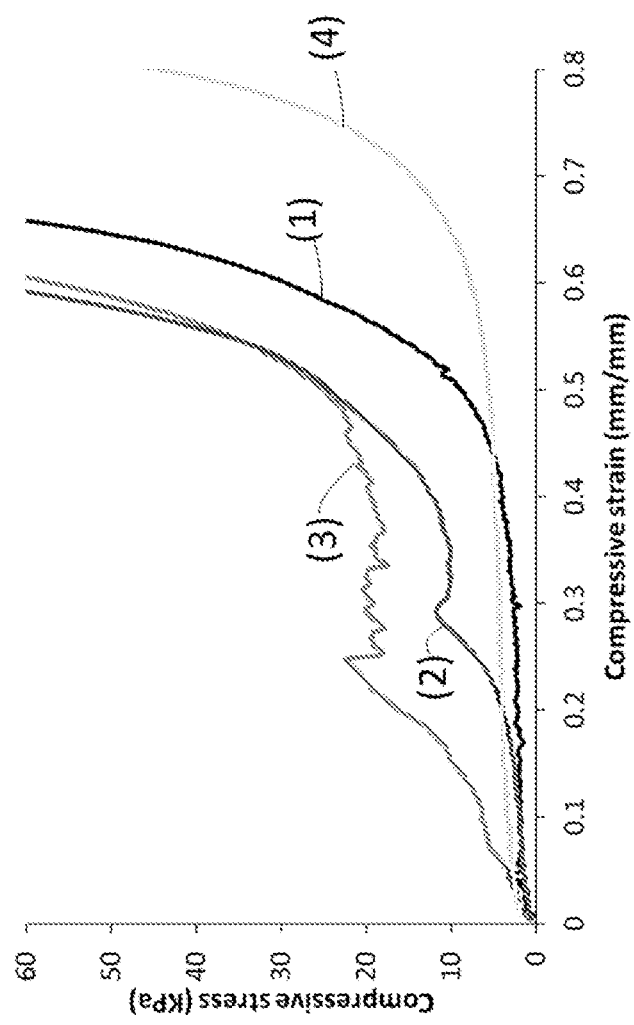

Compressive stress tests were performed. The plot of compressive stress versus compressive strain is shown in FIG. 9B for each composite resin object 1-3 as well for the comparative object 4. The results show that at the same compressive strain, stress on the composite resin objects depends upon the orientation of the relatively hard, cured PEG diacrylate lines within the relatively soft polyurethane foam body. Thus, the results demonstrate that composite resin objects can be fabricated to exhibit anisotropic mechanical properties. Moreover, the results demonstrate that the mechanical properties of the composite resin objects may be tuned by adjusting, e.g., the shape, dimensions, orientation, of cured region(s) within the polyurethane foam body.

Example 8

In this Example, experiments similar to those described in Example 4 were carried out to form composite resin objects from a polyurethane foam body soaked with a curable composition (based on PEG diacrylate as described in Example 4). Two fabricated composite resin objects are shown schematically in FIGS. 10A and labeled 1 and 2. For composite resin object 1, the soaked polyurethane foam body was irradiated with the focused ultrasound beam to form three parallel 30 mm cylinders of cured PEG diacrylate centered within the polyurethane foam body. For composite resin object 2, the soaked polyurethane foam body was irradiated with the focused ultrasound beam to form a single 10 mm cylinder of cured PEG diacrylate centered within the polyurethane foam body. For composite resin objects 1-2, after fabrication and prior to compressive tests descried below, unpolymerized curable composition was removed from the polyurethane foam bodies. A comparative object 3 is a similarly sized cubic shaped piece of polyurethane foam without any curable composition therein (and thus, without any cured curable composition).

Figure 10B:
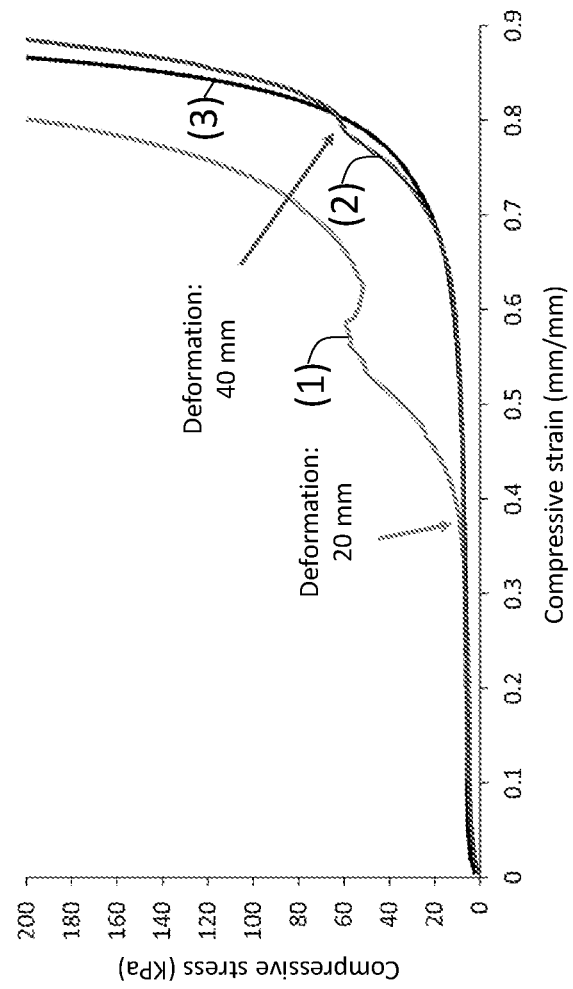

Compressive stress tests were performed. The plot of compressive stress versus compressive strain is shown in FIG. 10B for composite resin objects 1 and 2 as well for the comparative object 3. The results show an increase of stress at a certain deformation/strain for composite resin objects 1 and 2, due to the presence of the relatively hard, cured PEG diacrylate cylinders within the relatively soft polyurethane foam body. Moreover, the results demonstrate that the mechanical properties of the composite resin objects may be tuned by adjusting, e.g., the shape, dimensions, orientation, of cured region(s) within the polyurethane foam body.

Example 9

In this Example, experiments similar to those described in Example 4 were carried out to form composite resin objects from a polyurethane foam body soaked with a curable composition (based on PEG diacrylate as described in Example 4). During irradiation, the soaked polyurethane foam body was placed under a compressive force. The irradiation was carried out with the focused ultrasound beam to form a single cylinder of cured PEG diacrylate within the compressed polyurethane foam body. The compressive force was removed only after irradiation.

Example 10

Figure 12:
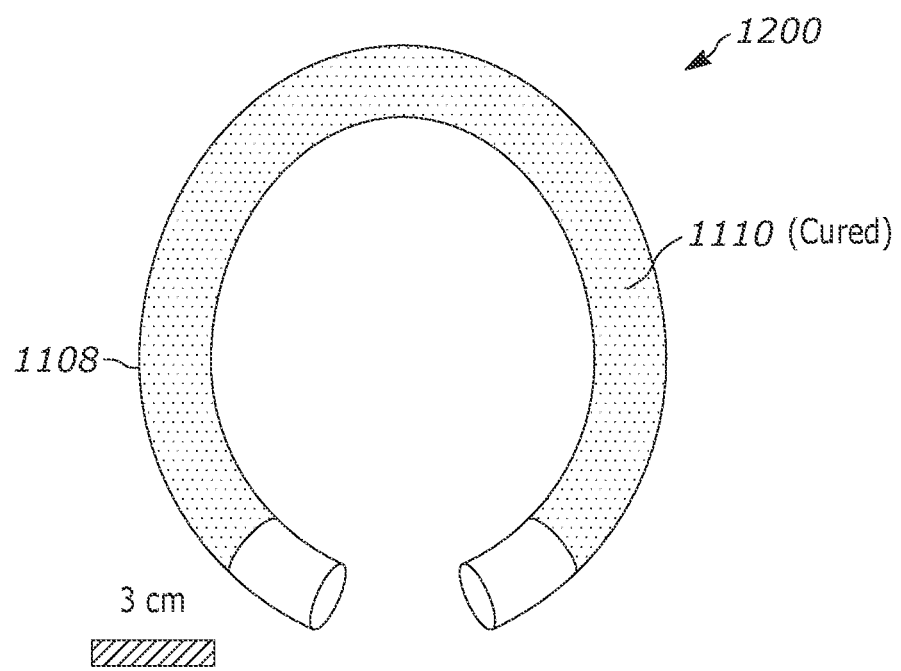
FIG. 12 shows an illustrative object fabricated using the system 1100 of FIG. 11.

In this Example, another illustrative system 1100 for fabricating resin objects from curable compositions using focused ultrasound was used. A portion of the system 1100 is shown schematically in FIG. 11. In this embodiment, the source 1102 configured to provide a focused ultrasound beam was provided by the transducer of a portable ultrasound device 1132, commercially available from Dynatronics. A flexible plastic tube 1108 was used as the container configured to contain a curable composition 1110. The curable composition 1100 was formed by mixing PEG diacrylate with an aqueous ammonium persulfate solution. Curable compositions were prepared using 575 Da PEG diacrylate and others using 700 Da PEG diacrylate. The aqueous ammonium persulfate solution was 0.2 g/mL. The ammonium persulfate solution was used in the curable compositions at 0.5 or 1 weight % of PEG diacrylate. Ultrasound gel, also commercially available from Dynatronics, was used as a coupling fluid 1114. The frequency of the focused ultrasound beam was 3 MHz and the power was 10 W. As shown in FIG. 11, the transducer 1102 of the portable ultrasound device was covered with the ultrasound gel 1114 and the flexible plastic tube 1108 filled with the curable composition 1110 was positioned on the ultrasound gel 1114. The focused ultrasound beam irradiated the curable composition 1110 to induce polymerization reactions at its focal spot. Although the focal spot could be moved to multiple locations by moving the transducer 1102 and/or the flexible plastic tube 1108 relative to one another, this is not necessary. In this embodiment, heat transfer and the kinetics of exothermic polymerization were fast enough so that the polymerization propagated throughout the entire volume of the curable composition 1110 within the flexible plastic tube 1108, resulting in a cylindrically shaped resin object 1200 as shown in FIG. 12. As shown in FIG. 12, during polymerization, the shape of the filled flexible plastic tube 1108 may be adjusted as desired, e.g., to form a U-shape. This is useful for forming devices such as wrist and neck braces.

As used herein, the term "mount" includes join, unite, connect, couple, associate, insert, hang, hold, affix, attach, fasten, bind, paste, secure, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element). The elements may be mounted permanently, removably, or releasably unless specified otherwise.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for fabricating a plurality of resin objects, the method comprising steps:
   (a) irradiating a curable composite at a first location with a focal spot of a focused ultrasound beam,
   the focal spot having an intensity of sound waves at the focal spot that is greater than an intensity of sound waves emanating from a sound wave source,
   the curable composite comprising a porous material having a solid matrix defining pores distributed throughout the solid matrix and a curable composition comprising prepolymers filling the pores,
   wherein the step (a) forms a first cured region of a first polymer within the curable composite so as to provide a first resin object comprising an interpenetrating network comprising the solid matrix of the porous material entangled with the first polymer of the first cured region; and
   (b) moving the focal spot and the curable composition relative to one another and irradiating the curable composite with the focal spot at a second location separated from the first location, wherein the step (b) forms a second cured region of the first polymer so as to provide a second resin object comprising another interpenetrating network comprising the solid matrix of the porous material entangled with the first polymer of the second cured region, the second resin object separated from the first resin object by the solid matrix such that the first resin object and the second resin object form a plurality of resin objects separated from one another by the solid matrix,
   wherein the first and second resin objects of the plurality of resin objects are embedded within the porous material and have one or more outer dimensions that are smaller than the porous material,
   and further wherein the pores of the porous material have an average pore size that is smaller than that of the focal spot.

2. The method of claim 1, wherein the prepolymers comprise (meth) acrylates.

3. The method of claim 1, wherein the curable composition further comprises an initiator, a fluid, and an inhibitor.

4. The method of claim 3, wherein the initiator is a thermal initiator.

5. The method of claim 1, wherein the curable composition has a viscosity at room temperature of at least 15 cP.

6. The method of claim 1, wherein the curable composition has a viscosity at room temperature in a range of from 50 cP to 100 cP.

7. The method of claim 1, wherein the porous material is a foam body.

8. The method of claim 7, wherein the foam body is a polymer foam body.

9. The method of claim 1, further comprising forming the curable composite by introducing the curable composition into the pores of the porous material and degassing the curable composite prior to the step (a).

10. The method of claim 1, further comprising (c) removing unpolymerized curable composition from the porous material after the step (a).

11. The method of claim 10, further comprising (d) introducing another curable composition into the pores of the porous material and repeating the step (a) to form another cured region of a second polymer within the curable composite.

12. The method of claim 11, wherein the another curable composition comprises other prepolymers of a different type than the curable composition.

13. The method of claim 12, wherein the interpenetrating network of the first resin object has a first portion comprising the solid matrix of the porous material entangled with the first polymer of the first cured region and a second portion comprising the solid matrix of the porous material entangled with the second polymer.

14. The method of claim 1, further comprising deforming the porous material during the step (a).

* * * * *